Figure 1:
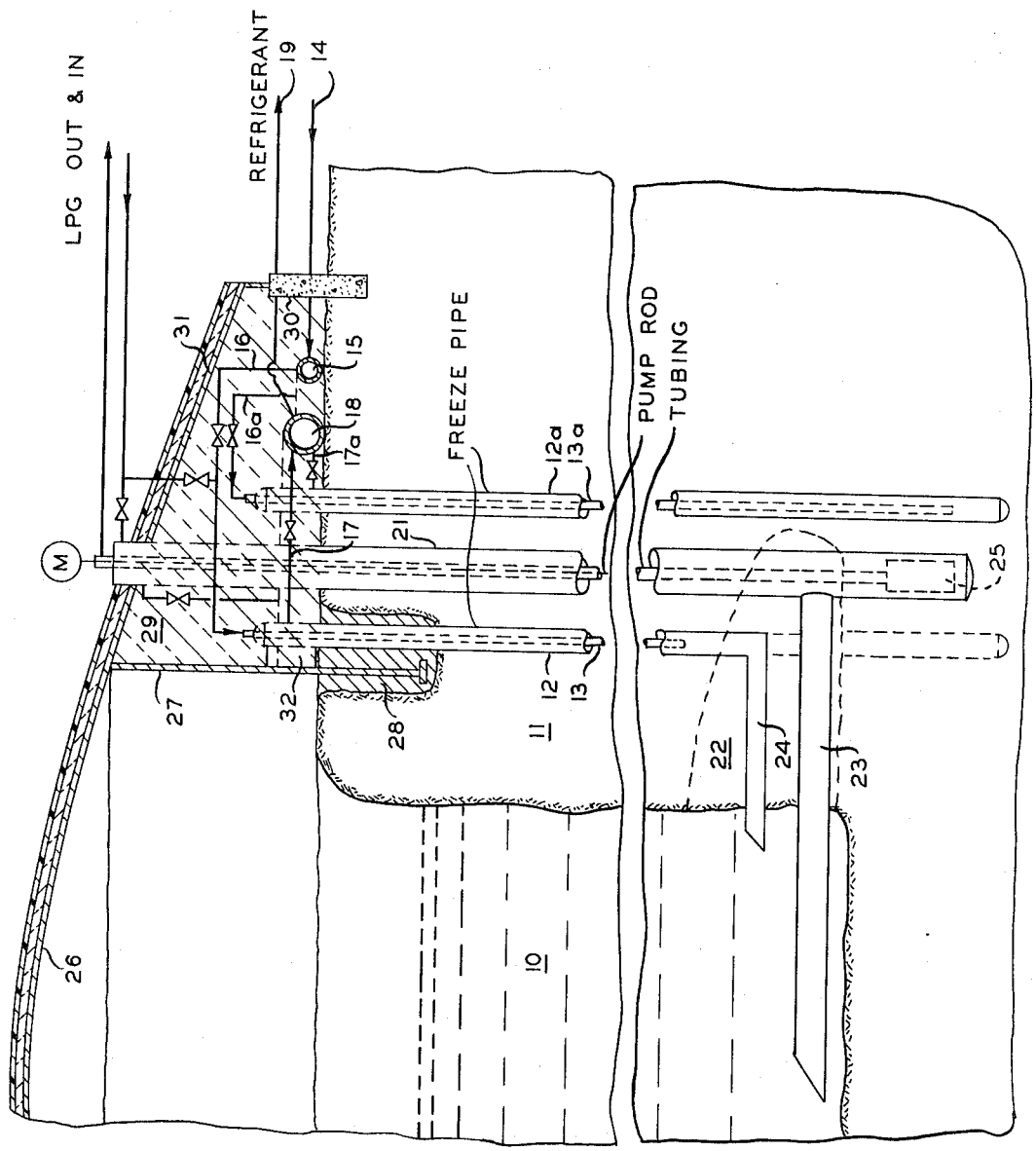

Feb. 21, 1967  W. M. FAULCONER  3,304,725
PREPARING A RESERVOIR FOR STORAGE OF VOLATILE LIQUIDS
Filed Aug. 19, 1963  2 Sheets-Sheet 1

INVENTOR.
W. M. FAULCONER
BY Young and Quigg
ATTORNEYS

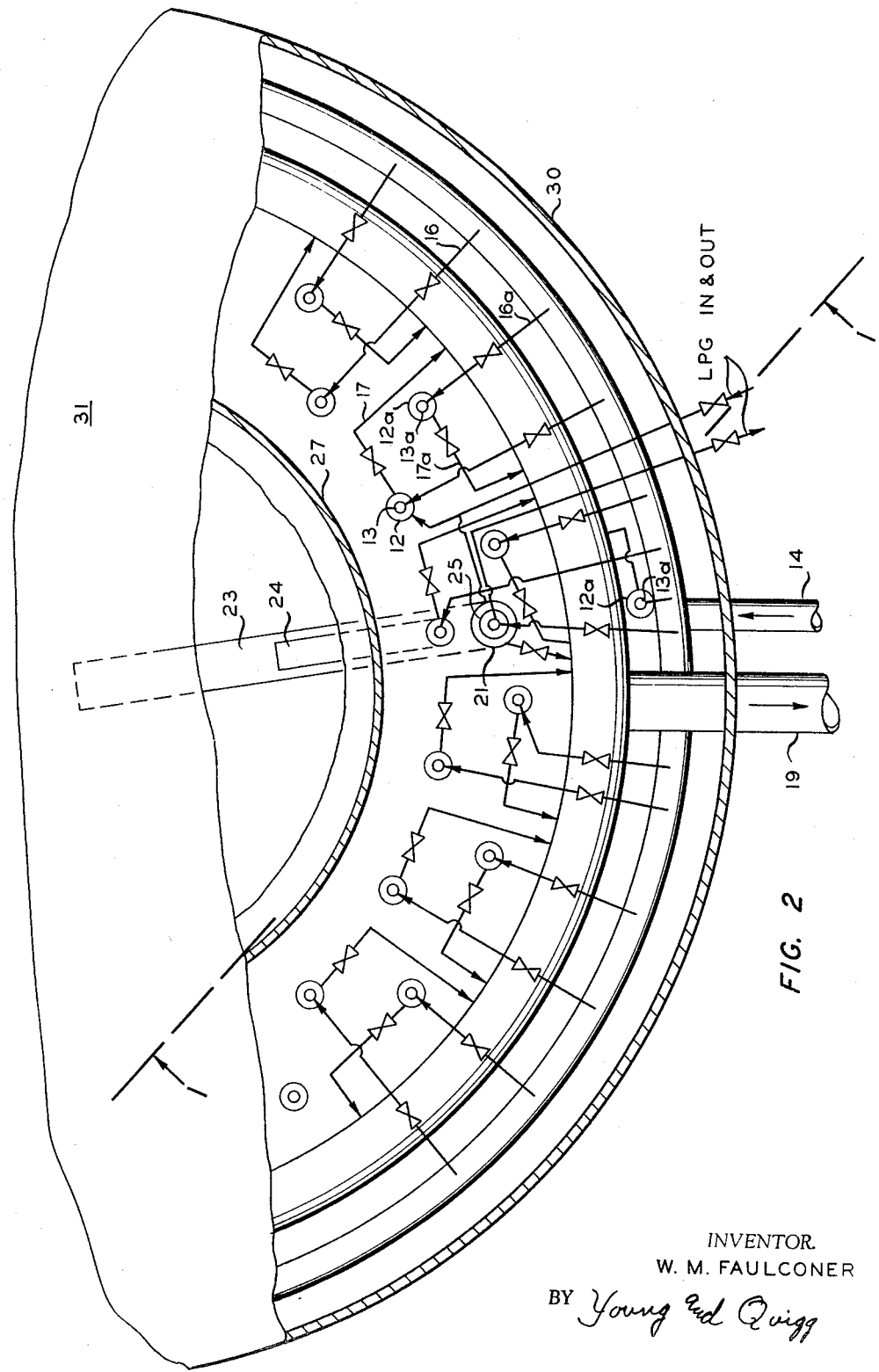

United States Patent Office 3,304,725
Patented Feb. 21, 1967

3,304,725
PREPARING A RESERVOIR FOR STORAGE OF VOLATILE LIQUIDS
William M. Faulconer, Bartlesville, Okla., assignor to Phillips Petroleum Company, a corporation of Delaware
Filed Aug. 19, 1963, Ser. No. 302,883
2 Claims. (Cl. 61—.5)

This invention relates to the storage of volatile liquids. In one aspect it relates to a method for preparing a reservoir in the surface of the earth for the storage of volatile liquids. In another aspect it relates to an open-topped earthen reservoir in frozen earth having a vapor-impermeable cover thereover.

The petroleum industry produces great quantities of volatile liquid hydrocarbons as a result of processing crude oil and natural gas. Volatile liquids such as propane and butane require enormous storage facilities during periods of slack use. Increased seasonal demand for such products places an increased strain on these facilities. Great quantities of volatile liquids including propane and butane have been stored in underground caverns mined or dissolved from impervious formations. Such reservoirs, however, are limited to certain formations which are not always available at the desired location; are expensive to prepare; and present a serious problem of providing adequate vapor seals. More recently it has been proposed to fill an open-topped earthen reservoir with water, refrigerate the reservoir so as to freeze an ice cap on the water, pump out the water and fill the reservoir with a volatile liquid. Such reservoir is disclosed and claimed in Patent Number 2,961,840, issued November 29, 1960, to W. A. Goldtrap.

According to the present invention a plurality of freeze pipes is sunk into the earth around the periphery of the earthen reservoir site to freeze the earth for excavation of the reservoir and to maintain the earth frozen during the life of the reservoir and after the freezing operation is accomplished and the reservoir is excavated one of the freeze pipes is converted to a pump jacket. A passageway or tunnel is dug in the frozen earth from a point near the bottom of the reservoir to the freeze pipe which is to serve as pump jacket. An opening is cut in the freeze pipe and a conduit is connected to this opening so as to project horizontally through the passageway into the reservoir as the pump suction conduit. The pump jacket conduit can be one of the regular freeze pipes or can be an extra conduit in addition to the regular freeze pipes. Since the pump jacket will usually be a larger conduit than the freeze pipes, it will usually be advantageous to install the pump jacket at the same time the freeze pipes are installed and to use the pump jacket as an additional freeze pipe during the initial freezing period when the greatest freezing capacity is required.

Further according to the invention the pump jacket can also be utilized as the fill conduit for introducing liquid to the reservoir if the pump is positioned at a level below the pump suction conduit. Alternatively one of the regular freeze pipes can be converted to a fill line after the initial freezing is accomplished.

In earthen storage systems of this type it is customary to install the discharge and fill lines through the roof of the reservoir. The present invention makes the discharge and fill lines accessible and serviceable from the ground level and removes a great amount of weight from the roof.

It is an object of this invention to provide a combined freeze pipe and liquid discharge conduit for a volatile liquid storage system in the frozen surface of the earth. It is also an object to provide a combined freeze pipe and fill line for a volatile liquid storage system in the frozen surface of the earth. A further object of the invention is to provide a method for transferring liquid to and from a frozen earth reservoir at a locus other than through the roof. Still another object is to provide a method for installing a discharge and fill line in a frozen earth storage system by converting a freeze pipe to a discharge pump jacket and a fill line. Other objects and advantages of the invention will be apparent to one skilled in the art upon study of the disclosure including the detailed description and the appended drawing wherein:

FIGURE 1 is a view in cross-section of one side of an earthen reservoir in accordance with the invention; and FIGURE 2 is a plan view of a segment of the reservoir of FIGURE 1 with a portion of the roof removed.

Referring now to the drawing and particularly to FIGURE 1 a reservoir 10 is shown excavated in frozen earth 11. The earth is frozen by means of a plurality of freeze pipes 12 and 12a sunk into the ground around the periphery of the reservoir 10 site. The freeze pipes comprise a casing 12, 12a and an inlet pipe 13, 13a. A refrigerant is supplied to inlet pipes 13 and 13a via conduit 14, manifold 15 and conduits 16 and 16a from a refrigeration system (not shown). Several banks of freeze pipes can be utilized as desired as indicated by 12 and 12a. Refrigerant vapors are removed from conduits 12 and 12a via conduits 17, 17a, manifold 18 and conduit 19 to the refrigeration system. The refrigeration system can be a conventional compressor and condenser combination.

A pump jacket conduit 21 is sunk into the ground at the same time as the freeze pipes and can conveniently be placed between the rows of freeze pipe casings 12 and 12a. During the freezing period a refrigerant inlet pipe will be positioned in the conduit 21 as in the freeze pipe conduits 12 and 12a and the conduit 21 will be employed as a freeze pipe.

After the excavation of reservoir 10 is completed the conduit 21 will be disconnected from the refrigeration system and a passageway, indicated by the area 22, excavated to provide access to the conduit 21. An opening is cut in the side of conduit 21 and a pump suction conduit 23 is welded to the opening in conduit 21. If it is desired to utilize one of the freeze pipes as a fill line this can also be done when the excavation 22 is made by cutting off the bottom portion of the casing 12 and welding on the stub section 24 to project into the reservoir 10. After the conduits 23 and 24 are installed the passageway 22 is packed with mud which is frozen.

The pump 25 is positioned in the pump jacket 21 at a point below the pump suction conduit 23. The pump 25 can be any conventional submerged pump suitable for lifting hydrocarbon liquids at the low temperatures involved.

The insulated roof 26 is supported by wall 27 which is sealed to the frozen earth by being frozen into a body 28 of mud or ice. Insulation 29 is placed around the wall 27 in the space between wall 27 and curb 30 and under extension 31 of roof 26.

The invention will now be described as applied to a circular earthen reservoir 95 feet in diameter and 95 feet deep. A first 111 foot diameter circle and a second 117 foot diameter circle of freeze pipes are sunk 150 feet into the ground around the reservoir site. The freeze pipe casings 12 and 12a are 4 inch diameter conduits and the liquid refrigerant inlet pipes 13 and 13a are 1 inch diameter conduits. A 10 inch diameter conduit is sunk between the rows of freeze pipes to serve as the discharge pump jacket. Liquid refrigerant (propane) is supplied to the lower end of the freeze pipes via the inlet pipes.

The ring wall 27 is sunk into the ground and the portions of the wall and freeze pipes which project above the ground are covered with crushed rock and insulation and freezing is begun. Excavation of the reservoir 10 is started about two months after freezing is begun. The exposed frozen wall of the reservoir is insulated as excavation progresses.

The passageway 22 is excavated and the conduit 21 and the adjacent freeze pipe 12 are disconnected from the refrigeration system. Freeze pipe 12 is cut off and an opening is cut into conduit 21. Conduit 23 is welded over the opening. Conduit 24 is then welded to conduit 12 and the passageway 22 is filled with mud which is frozen to seal the wall of the reservoir 10.

The roof is then fabricataed and welded to the top of the ring wall and pump 25 is positioned in conduit 21. The liquid discharge conduit is connected to the pump 25 outlet and the liquid fill line is connected to the fill pipe 12. The ring wall is secured to the freeze pipes 12 by welding a gusset 32 to the wall and to the pipes.

The metal used in the above storage system for low temperature service, e.g., the freeze pipes, roof and ring wall is weldable steel having superior low temperature impact properties. Steel for such service is commercially available.

The above reservoir is adapted for storage of liquid propane at substantially atmospheric pressure. Other volatile liquids such as liquefied natural gas; liquefied methane, ethane or butane; liquid ammonia; and the like, can be stored in the above reservoir by choosing the proper refrigerant. The material being stored is usually satisfactory as refrigerant.

That which is claimed is:

1. The method of installing a pump for discharging liquid from, and a conduit for introducing liquid to, a reservoir in frozen earth wherein the earth adjacent the reservoir is maintained frozen by a plurality of freeze pipes vertically positioned in the earth which comprises excavating a passageway from the wall of the completed reservoir to one of said freeze pipes; cutting an opening in said freeze pipe adjacent said passageway; connecting one end of a conduit section to said opening so as to communicate with said reservoir; placing a pump in said one freeze pipe; connecting said pump to one end of a discharge conduit; and connecting said freeze pipe to one end of an inlet conduit.

2. The method of installing a pump for discharging liquid from, and a conduit for introducing liquid to, a reservoir in frozen earth wherein the earth adjacent the reservoir is maintained frozen by a plurality of freeze pipes vertically positioned in the earth around the reservoir which comprises excavating a first passageway from the wall of the completed reservoir to a first freeze pipe; cutting an opening in the first freeze pipe adjacent the first passageway; excavating a second passageway from the wall of the completed reservoir to a second freeze pipe; cutting an opening in the second freeze pipe adjacent the second passageway; placing a pump in said first freeze pipe; connecting said opening of said first freeze pipe to one end of a discharge conduit; and connecting said opening of said second freeze pipe to one end of an inlet conduit.

References Cited by the Examiner

UNITED STATES PATENTS

| | | | |
|---|---|---|---|
| 2,796,739 | 6/1957 | Meade et al. | 61—36 X |
| 2,814,406 | 11/1957 | Marancik | 220—18 X |
| 3,159,006 | 12/1964 | Sliepcevich | 61—.5X |
| 3,175,370 | 3/1965 | Schlumberger et al. | 61—.5 X |
| 3,195,310 | 7/1965 | Schroeder | 61—.5 |

FOREIGN PATENTS

| | | |
|---|---|---|
| 111,569 | 3/1962 | Pakistan. |

EARL J. WITMER, *Primary Examiner.*